United States Patent
Haryu et al.

(10) Patent No.: US 8,961,748 B2
(45) Date of Patent: Feb. 24, 2015

(54) WATER ELECTROLYSIS SYSTEM

(75) Inventors: Eiji Haryu, Wako (JP); Koji Nakazawa, Wako (JP); Masanori Okabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 13/239,876

(22) Filed: Sep. 22, 2011

(65) Prior Publication Data

US 2012/0090989 A1 Apr. 19, 2012

(30) Foreign Application Priority Data

Oct. 14, 2010 (JP) ................................ 2010-231549

(51) Int. Cl.
- C25B 9/00 (2006.01)
- C25B 1/04 (2006.01)
- C25B 1/00 (2006.01)
- C25B 1/08 (2006.01)
- C25B 15/08 (2006.01)

(52) U.S. Cl.
CPC .............. *C25B 15/08* (2013.01); *Y02E 60/366* (2013.01); *C25B 1/08* (2013.01)
USPC ............................ 204/242; 204/237; 205/628

(58) Field of Classification Search
CPC .............. C25B 1/00; C25B 1/04; C25B 9/00; C25C 7/00
USPC .................................. 204/242, 237; 205/628
See application file for complete search history.

(56) References Cited

U.S. PATENT DOCUMENTS

| 2005/0000800 A1* | 1/2005 | Speranza et al. ............... 204/258 |
| 2006/0254907 A1* | 11/2006 | Taruya et al. .................. 204/266 |
| 2010/0206740 A1* | 8/2010 | Takeuchi et al. ............... 205/338 |
| 2011/0253526 A1* | 10/2011 | McAlister ....................... 204/235 |
| 2012/0026475 A1* | 2/2012 | Kida .............................. 355/30 |

FOREIGN PATENT DOCUMENTS

| JP | 2004-107775 | 4/2004 |
| JP | 2005-187916 | 7/2005 |
| JP | 2009-191333 | 8/2009 |

OTHER PUBLICATIONS

English Translation of JP 2005-187916 to Hiroshi (2005).*
Chinese Office Action for corresponding CN Application No. 201110252722.2, Oct. 15, 2013.
Japanese Office Action for corresponding JP Application No. 2010-231549, Sep. 13, 2013.

* cited by examiner

*Primary Examiner* — Zulmariam Mendez
(74) *Attorney, Agent, or Firm* — Mori & Ward, LLP

(57) ABSTRACT

A water electrolysis system includes a water electrolysis apparatus, a low-pressure gas-liquid separator, a high-pressure gas-liquid separator, water pipe, and a decompression water supply device. The high-pressure gas-liquid separator separates the hydrogen received from a cathode of the water electrolysis apparatus and permeation water that has permeated from the anode. The water pipe connects the high-pressure gas-liquid separator and the low-pressure gas-liquid separator and is used for returning the water from the high-pressure gas-liquid separator to the low-pressure gas-liquid separator. The decompression water supply device is arranged at the water pipe and is to decompress the water discharged from the high-pressure gas-liquid separator.

5 Claims, 7 Drawing Sheets

BACKGROUND ART

WATER ELECTROLYSIS SYSTEM

CROSS-REFERENCE TO RELATED APPLICATIONS

The present application claims priority under 35 U.S.C. §119 to Japanese Patent Application No. 2010-231549, filed Oct. 14, 2010, entitled "Water Electrolysis System". The contents of this application are incorporated herein by reference in their entirety.

BACKGROUND OF THE INVENTION

1. Field of the Invention

The present invention relates to a water electrolysis system.

2. Discussion of the Background

Recently, a system for supplying an electric power or power using hydrogen as a fuel, for example, a fuel-cell system has been proposed. The type of system employs a water electrolysis apparatus that electrolyzes water and generates hydrogen (and oxygen) in producing hydrogen as a fuel.

The water electrolysis apparatus uses a solid polymer electrolyte membrane (ion exchange membrane) to electrolyze water and generate hydrogen (and oxygen). Electrode catalytic layers are provided at opposite surfaces of the solid polymer electrolyte membrane to form an electrolyte membrane electrode assembly, and an anode-side feed and a cathode-side feed are disposed at both sides of the electrolyte membrane electrode assembly. This configuration forms a unit.

The above-described water electrolysis apparatus produces hydrogen containing moisture, and thus it is necessary to remove the moisture from the hydrogen to obtain hydrogen in a dry state, for example, at or below 5 ppm (hereinafter referred to also as dry hydrogen). One known example of a technique that meets such a need is a solid polymer water electrolysis hydrogen production device disclosed in Japanese Unexamined Patent Application Publication No. 2005-187916.

This hydrogen production device includes a water electrolysis layer 1 that electrolyzes water using a polymer electrolyte membrane and generates oxygen at the anode and hydrogen at the cathode, a hydrogen gas-liquid separator 2 that separates the hydrogen generated at the cathode and water, an oxygen gas-liquid separator 3 that separates the oxygen generated at the anode and water, a water circulation line 4 that supplies water to the water electrolysis layer 1, a hydrogen line 6 provided to the hydrogen gas-liquid separator 2 and including a flow control valve 5a, and an oxygen line 7 provided to the oxygen gas-liquid separator 3 and including an oxygen pressure control valve 5b.

This type of system employs a high-pressure water electrolysis system that generates high-pressure hydrogen (e.g., at approximately 35 MPa) from the water electrolysis layer 1.

SUMMARY OF THE INVENTION

According to one aspect of the present invention, a water electrolysis system includes a water electrolysis apparatus, a low-pressure gas-liquid separator, a high-pressure gas-liquid separator, water pipe, and a decompression water supply device. The water electrolysis apparatus is configured to electrolyze water to generate oxygen and hydrogen having a pressure higher than a pressure of the oxygen. The low-pressure gas-liquid separator separates the oxygen and the water that are received from an anode of the water electrolysis apparatus. The low-pressure gas-liquid separator is to supply the separated water to the water electrolysis apparatus in a circulating manner. The high-pressure gas-liquid separator separates the hydrogen received from a cathode of the water electrolysis apparatus and permeation water that has permeated from the anode. The water pipe connects the high-pressure gas-liquid separator and the low-pressure gas-liquid separator and is used for returning the water from the high-pressure gas-liquid separator to the low-pressure gas-liquid separator. The decompression water supply device is arranged at the water pipe and is to decompress the water discharged from the high-pressure gas-liquid separator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
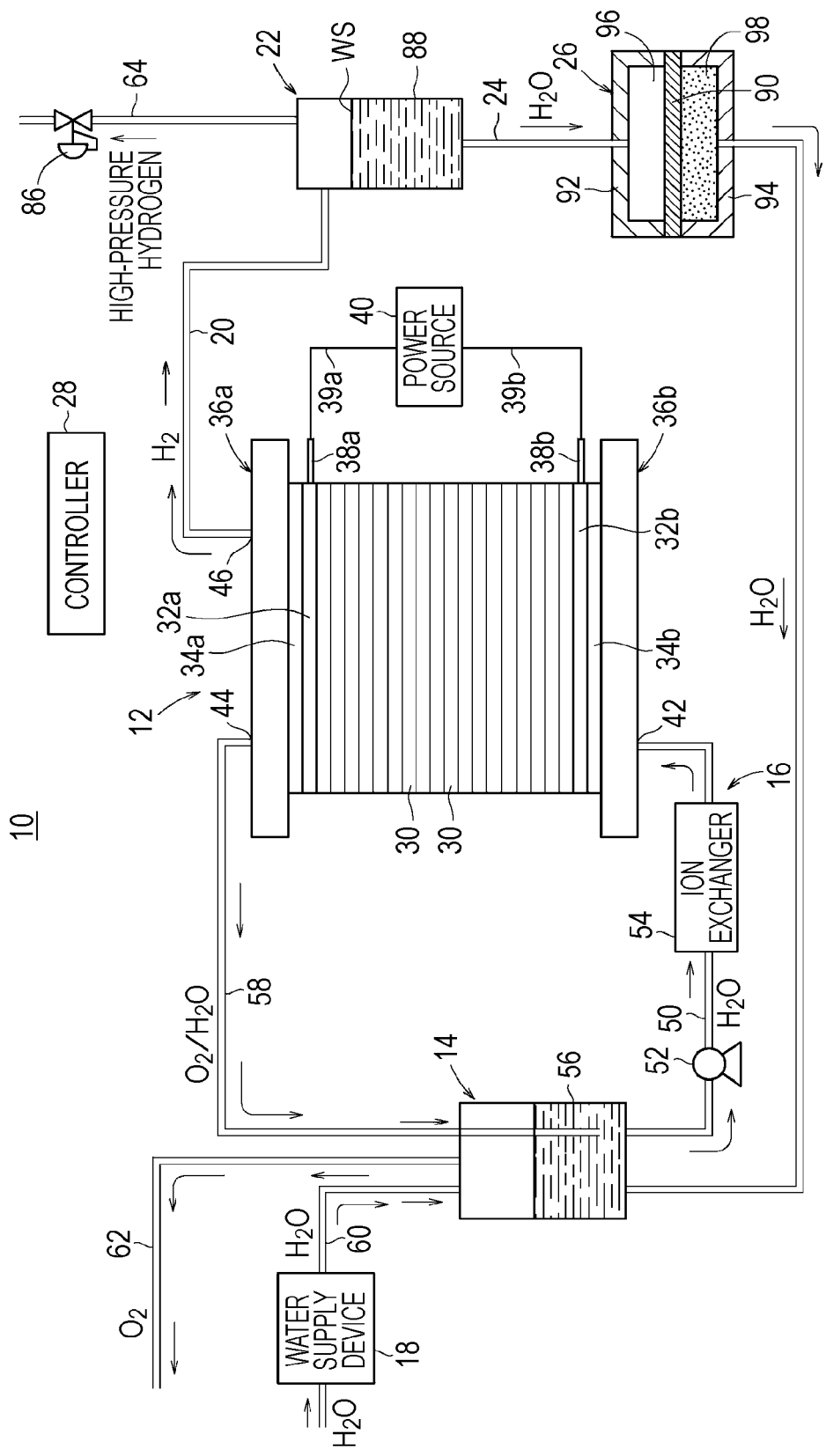
FIG. 1 illustrates a schematic configuration of a water electrolysis system according to a first embodiment of the present invention.

The embodiments will now be described with reference to the accompanying drawings, wherein like reference numerals designate corresponding or identical elements throughout the various drawings.

As illustrated in FIG. 1, a water electrolysis system 10 according to a first embodiment of the present invention includes a water electrolysis apparatus 12 that produces oxygen and high-pressure hydrogen (higher than the oxygen pressure being normal atmospheric pressure, e.g., at approximately 1 MPa to 70 MPa) by electrolyzing water (pure water).

The water electrolysis system 10 further includes, at a side adjacent to the anode of the water electrolysis apparatus 12, a low-pressure gas-liquid separator 14 that separates oxygen and redundant water discharged from the water electrolysis apparatus 12 and stores the water, a water circulation device 16 that circulates the water stored in the low-pressure gas-liquid separator 14 through the water electrolysis apparatus 12, and a water supply device 18 that supplies pure water generated from commercial water to the low-pressure gas-liquid separator 14.

The water electrolysis system 10 further includes a high-pressure gas-liquid separator 22 that removes moisture from high-pressure hydrogen introduced from the water electrolysis apparatus 12 to a high-pressure hydrogen pipe 20 at a side adjacent to the cathode of the water electrolysis apparatus 12 and also includes a water pipe 24 that connects the high-pressure gas-liquid separator 22 and the low-pressure gas-liquid separator 14 and that is used for returning water from the high-pressure gas-liquid separator 22 to the low-pressure gas-liquid separator 14. The water pipe 24 is provided with a decompression water supply device 26 that reduces the pressure of water discharged from the high-pressure gas-liquid separator 22. The water electrolysis system 10 further includes a controller 28 that controls the entire system.

The water electrolysis apparatus 12 includes a plurality of unit cells 30 being stacked. Each of the unit cells 30 includes an electrolyte membrane electrode assembly and an anode separator and a cathode separator that sandwich the electrolyte membrane electrode assembly (not illustrated). The electrolyte membrane electrode assembly can include a solid polymer electrolytic membrane in which a perfluorosulfonic acid thin film is impregnated with water and an anode-side feed and a cathode-side feed that are disposed on opposite surfaces of the solid polymer electrolytic membrane.

The water electrolysis apparatus 12 includes a terminal plate 32a, an insulation plate 34a, and an end plate 36a sequentially arranged outward at a first end in the direction in which the unit cells 30 are stacked. The water electrolysis apparatus 12 further includes a terminal plate 32b, an insulation plate 34b, and an end plate 36b sequentially arranged outward at a second end in the direction in which the unit cells 30 are stacked. The end plates 36a and 36b are integrally clamped and retained in the stacking direction.

The terminal plates 32a and 32b are provided with outwardly projecting terminal sections 38a and 38b, respectively. The terminal sections 38a and 38b are electrically coupled to an electrolytic power source 40 through leads 39a and 39b, respectively.

The outer edges of the unit cells 30 includes a water supply communicating hole 42 for use in supplying water (pure water), a discharge communicating hole 44 for use in discharging oxygen generated by reaction and unreacted water (mixed fluid), and a hydrogen communicating hole 46 for allowing hydrogen generated by reaction and permeation water that has permeated from the anode. The water supply communicating hole 42, discharge communicating hole 44, and hydrogen communicating hole 46 communicate with the outer edges in the stacking direction.

The water circulation device 16 includes a circulation pipe 50 communicating with the water supply communicating hole 42 of the water electrolysis apparatus 12. The circulation pipe 50 is provided with a circulation pump 52 and an ion exchanger 54 and is connected to the bottom of a tank unit 56 included in the low-pressure gas-liquid separator 14.

The top of the tank unit 56 communicates with a first end of a return pipe 58 whose second end communicates with the discharge communicating hole 44 of the water electrolysis apparatus 12. The first end of the return pipe 58 is set so as to be always open within water stored in the tank unit 56.

The tank unit 56 is coupled to a pure water supply pipe 60 connected to the water supply device 18 and also coupled to an oxygen discharge pipe 62 for use in discharging oxygen separated from pure water in the tank unit 56. The inside of the tank unit 56 is open to atmospheric pressure.

The hydrogen communicating hole 46 of the water electrolysis apparatus 12 is connected to a first end of the high-pressure hydrogen pipe 20 whose second end is connected to the high-pressure gas-liquid separator 22. High-pressure hydrogen from which moisture has been removed by the high-pressure gas-liquid separator 22 is discharged as dry hydrogen to a dry hydrogen pipe 64. The dry hydrogen pipe 64 is provided with a back pressure valve 86 set at a predetermined set pressure to maintain the pressure of the hydrogen generated at the water electrolysis apparatus 12 high.

The high-pressure gas-liquid separator 22 includes a tank unit 88 for storing water. The tank unit 88 is connected to a first end of the water pipe 24 whose second end is connected to the bottom of the tank unit 56 included in the low-pressure gas-liquid separator 14.

The decompression water supply device 26 arranged at the water pipe 24 has the functions of reducing the pressure of high-pressure water discharged from the high-pressure gas-liquid separator 22 to substantially the same pressure as that of the low-pressure gas-liquid separator 14 and discharging substantially the same amount of the water as the moisture content calculated on the basis of an electrolytic current in the water electrolysis apparatus 12.

For the first embodiment, the decompression water supply device 26 includes a water permeable membrane (water permeable member), for example, a solid polymer electrolytic membrane 90 in which perfluorosulfonic acid thin film is impregnated with water. The solid polymer electrolytic membrane 90 is disposed between a high-pressure side separator 92 and a low-pressure side separator 94. A high-pressure chamber 96 communicating with the water pipe 24 is disposed inside the dry hydrogen pipe 64.

A porous member 98 for retaining the solid polymer electrolytic membrane 90 and causing water to permeate therethrough is arranged inside the low-pressure separator 94. The porous member 98 can be formed from a powder sinter made of, for example, stainless steel or titanium.

The area of the solid polymer electrolytic membrane 90 in the decompression water supply device 26 is set such that the rate of water discharged from the water electrolysis apparatus 12 (rate of water permeating to the cathode together with produced hydrogen) is substantially the same as the water permeation rate in the decompression water supply device 26. The low-pressure separator 94 communicates with the low-pressure gas-liquid separator 14 through the water pipe 24.

Operations of the water electrolysis system 10 having the above-described configuration are described below.

First, when the water electrolysis system 10 starts, pure water generated from city water through the water supply device 18 is supplied to the tank unit 56 included in the low-pressure gas-liquid separator 14.

The water inside the tank unit 56 is supplied to the water supply communicating hole 42 of the water electrolysis apparatus 12 under the action of the circulation pump 52 in the water circulation device 16. A voltage is applied to the terminal sections 38a and 38b on the terminal plates 32a and 32b through the electrolytic power source 40 electrically coupled thereto.

Each of the unit cells 30 decomposes pure water by electricity and generates hydrogen ions, electrons, and oxygen. The hydrogen ions generated by this anodic reaction permeate through a solid polymer electrolytic membrane (not illustrated), move to the cathode, and combines with electrons, and produces hydrogen. At the anode, oxygen is generated and unreacted water exists.

The hydrogen is maintained at a higher pressure than that at the water supply communicating hole 42 through the back pressure valve 86, thus allowing the hydrogen to be supplied through the hydrogen communicating hole 46 to outside the water electrolysis apparatus 12, for example, a fuel tank of a fuel-cell vehicle.

At the anode, the oxygen generated by reaction and unreacted water flow, and the mixed fluid thereof is discharged to the return pipe 58 of the water circulation device 16 along the discharge communicating hole 44. After the unreacted water and the oxygen are introduced to the tank unit 56 and separated into gas and liquid, the water is introduced along the circulation pipe 50 through the circulation pump 52 and then the ion exchanger 54 to the water supply communicating hole 42. The oxygen separated from the water is discharged to the outside from the oxygen discharge pipe 62.

The hydrogen generated in the water electrolysis apparatus 12 is transmitted to the high-pressure gas-liquid separator 22 through the high-pressure hydrogen pipe 20. The high-pressure gas-liquid separator 22 separates water vapor (permeation water that has permeated from the anode) from the supplied hydrogen, stores the water in the tank unit 88, and sends the hydrogen to the dry hydrogen pipe 64.

The water stored in the tank unit 88 is discharged to the decompression water supply device 26 arranged at the water pipe 24. For the decompression water supply device 26, the upstream side is at a high pressure being the internal pressure of the tank unit 88 (e.g., approximately 35 MPa), whereas the downstream side is at a low pressure being the internal pressure of the tank unit 56 (atmospheric pressure).

Therefore, high-pressure water is supplied to the high-pressure chamber 96 disposed in the high-pressure separator 92. This high-pressure water permeates through the solid polymer electrolytic membrane 90, is decompressed, permeates through the porous member 98 disposed in the low-pressure separator 94, and is sent to the water pipe 24.

In this case, for the first embodiment, the decompression water supply device 26 has the functions of reducing the pressure of high-pressure water discharged from the high-pressure gas-liquid separator 22 to substantially the same pressure as that of the low-pressure gas-liquid separator 14 and discharging substantially the same amount of the water as the moisture content calculated on the basis of an electrolytic current in the water electrolysis apparatus 12. Specifically, the permeable area of the solid polymer electrolytic membrane 90 is set such that the rate of water discharged from the water electrolysis apparatus 12 is substantially the same as the water permeation rate in the decompression water supply device 26.

Accordingly, the water stored in the high-pressure gas-liquid separator 22 is decompressed by the decompression water supply device 26 and is supplied to the low-pressure gas-liquid separator 14 through the water pipe 24. The low-pressure gas-liquid separator 14 supplies the water obtained by gas-liquid separation and the water received from the high-pressure gas-liquid separator 22 to the water electrolysis apparatus 12 in a circulating manner.

This can prevent the water stored in the tank unit 88 of the high-pressure gas-liquid separator 22 from being unnecessarily discharged and enables efficiently supplying the water to a water electrolysis process in a circulating manner. Therefore, the advantageous effects of satisfactorily removing water from generated high-pressure hydrogen and enabling economical use of the water are obtainable.

Figure 2:
FIG. 2 illustrates a water level in a tank unit of a high-pressure gas-liquid separator included in the water electrolysis system.

In addition, for the first embodiment, the rate of water discharged from the water electrolysis apparatus 12 and the water permeation rate in the decompression water supply device 26 are set at substantially the same rate. Accordingly, in normal operation of the water electrolysis system 10, the water level WS in the tank unit 88 can be maintained constant (see FIG. 2).

This eliminates the need to adjust the amount of water discharged from the tank unit 88 to the low-pressure gas-liquid separator 14, and the advantage of obviating, for example, a pressure regulating mechanism for regulating a water pressure and a rate adjusting mechanism for adjusting a water permeation rate is obtainable.

Figure 3:
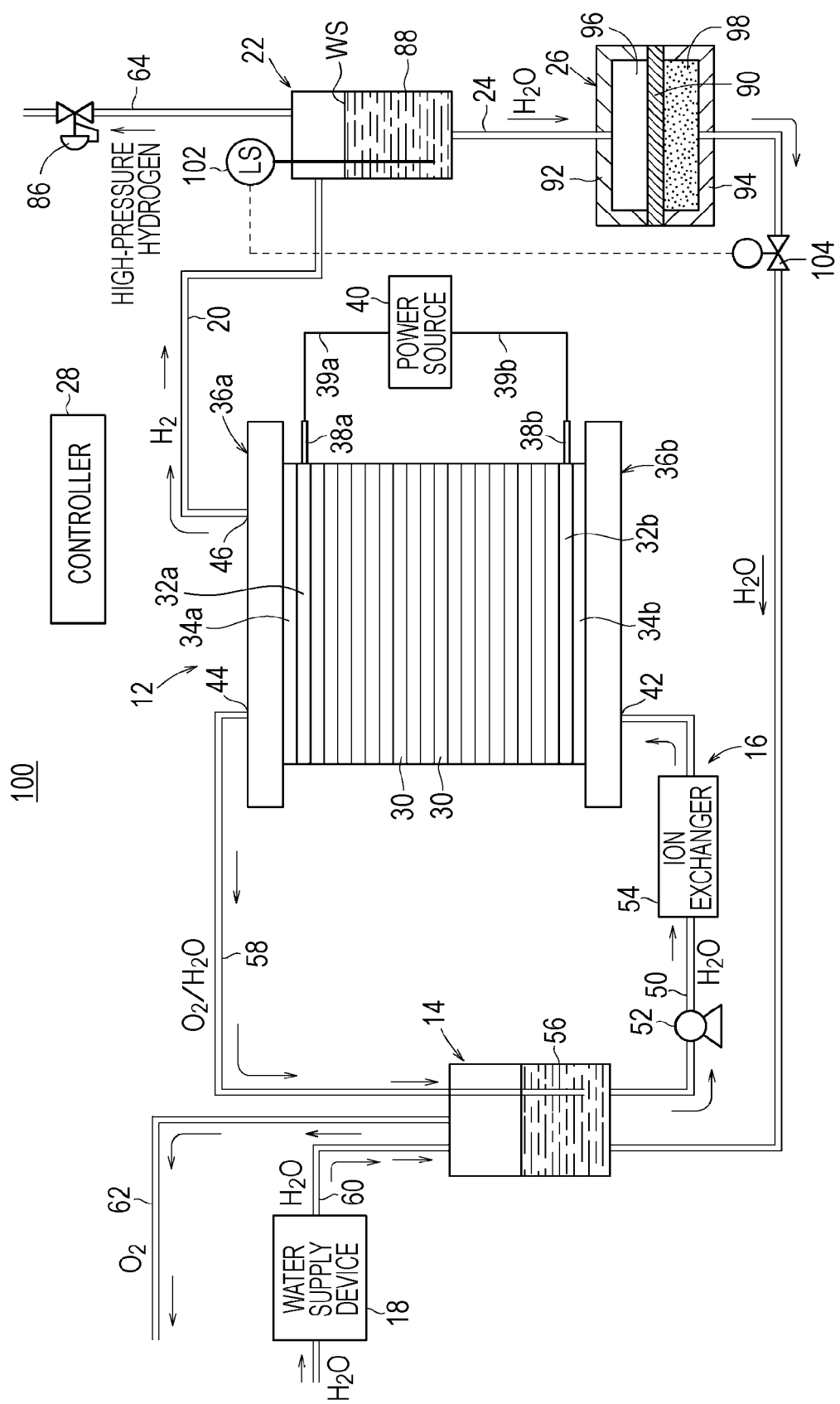
FIG. 3 illustrates a schematic configuration of a water electrolysis system according to a second embodiment of the present invention.

FIG. 3 illustrates a schematic configuration of a water electrolysis system 100 according to a second embodiment of the present invention.

The same reference numerals are used in the same components as in the water electrolysis system 10 according to the first embodiment, and the detailed description thereof is not repeated here. The same applies to third and subsequent embodiments described below, and the detailed description thereof is omitted.

For the water electrolysis system 100, the tank unit 88 in the high-pressure gas-liquid separator 22 is provided with a water-level sensor 102. The water-level sensor 102 detects an uppermost water level Hh indicating the necessity of discharging water and a lowermost water level Hl indicating the necessity of stopping the discharging by detecting a height (water level WS) of water stored in the tank unit 88.

The water pipe 24 is provided with a solenoid valve (on-off valve) 104 disposed downstream of the decompression water supply device 26. The on and off of the solenoid valve 104 is controlled through the controller 28 in response to a signal from the water-level sensor 102.

In this case, the amount of hydrogen produced by the water electrolysis apparatus 12 and the hydrogen pressure are variable, and the rate of water discharged from the water electrolysis apparatus 12 varies. Thus, the permeable area of the solid polymer electrolytic membrane 90 in the decompression water supply device 26 is set such that the water permeation rate in the decompression water supply device 26 is always larger than the maximum value of the rate of water discharged from the water electrolysis apparatus 12.

For the second embodiment described above, at the start of a water electrolysis process performed by the water electrolysis apparatus 12, the solenoid valve 104 is closed, and water discharged from the water electrolysis apparatus 12 is stored in the tank unit 88 of the high-pressure gas-liquid separator 22. The water level WS in the tank unit 88 is detected by the water-level sensor 102, and a signal is transmitted from the water-level sensor 102 to the controller 28.

Then, when the water-level sensor 102 detects that the water level WS in the tank unit 88 has reached the uppermost water level Hh, the controller 28 opens the solenoid valve 104. Therefore, after the water in the tank unit 88 is decompressed through the decompression water supply device 26, the resultant water is discharged to the low-pressure gas-liquid separator 14 through the solenoid valve 104.

At this time, the water permeation rate in the decompression water supply device 26 is set so as to be always larger than the maximum value of the rate of water discharged from the water electrolysis apparatus 12. Accordingly, for the tank unit 88, the amount of water discharged from the water electrolysis apparatus 12 is larger than the amount of water supplied to the low-pressure gas-liquid separator 14 through the water pipe 24.

Figure 4:
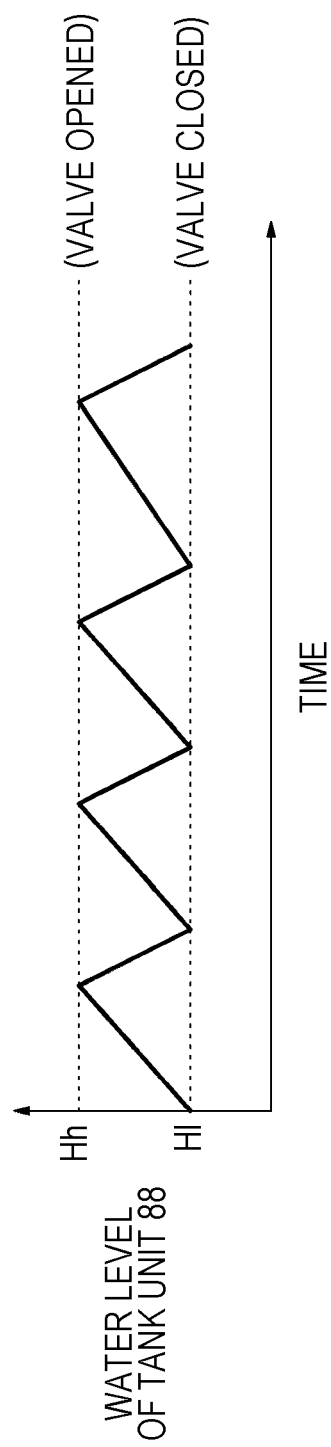
FIG. 4 illustrates a water level in a tank unit of a high-pressure gas-liquid separator included in the water electrolysis system.

In response to this, when the water-level sensor 102 detects that the water level WS in the tank unit 88 has reduced to the lowermost water level Hl, the solenoid valve 104 is closed. In this way, the water level WS in the tank unit 88 varies, as illustrated in FIG. 4.

Therefore, even if the amount of hydrogen produced by the water electrolysis apparatus 12 and the hydrogen pressure are variable, the second embodiment can achieve substantially the same advantageous effects as in the above-described first embodiment.

For the first and second embodiments, the decompression water supply device 26 uses the solid polymer electrolytic membrane 90 for decompressing water and causing the water to permeate therethrough. However, any element other than the solid polymer electrolytic membrane 90 may be used. For example, in place of the solid polymer electrolytic membrane 90, a single water permeable member made of porous ceramic or porous metal may be used.

Figure 5:
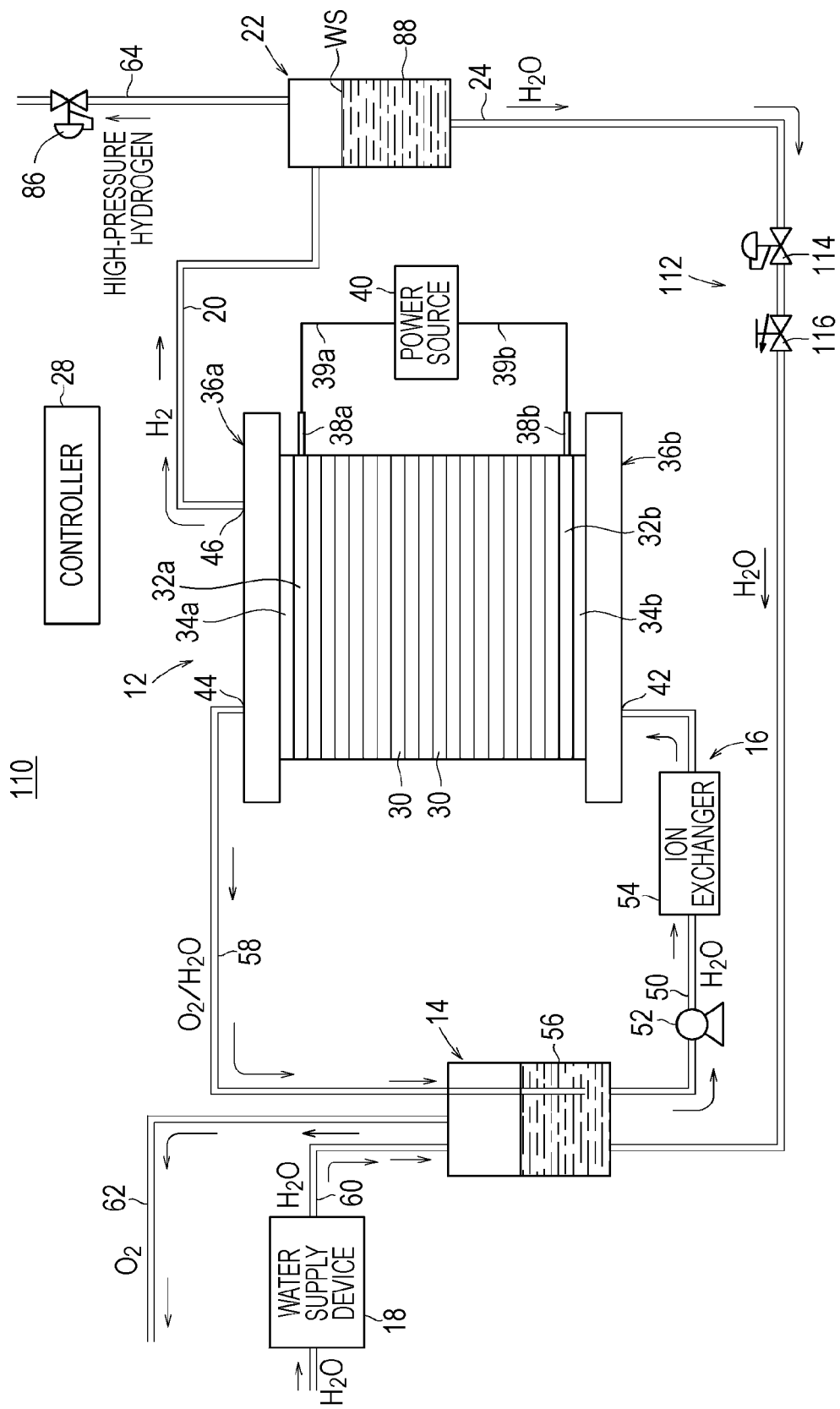
FIG. 5 illustrates a schematic configuration of a water electrolysis system according to a third embodiment of the present invention.

FIG. 5 illustrates a schematic configuration of a water electrolysis system 110 according to a third embodiment of the present invention.

The water electrolysis system 110 includes a decompression water supply device 112 arranged at the water pipe 24. The decompression water supply device 112 includes a pressure reducing valve 114 and a flow control valve 116 arranged in sequence along the direction from the high-pressure gas-liquid separator 22 toward the low-pressure gas-liquid separator 14, i.e., along the direction in which water is discharged.

In this case, for the third embodiment, the decompression water supply device 112 has the functions of reducing the pressure of high-pressure water discharged from the high-pressure gas-liquid separator 22 to substantially the same pressure as that of the low-pressure gas-liquid separator 14 and discharging substantially the same amount of the water as the moisture content calculated on the basis of an electrolytic current in the water electrolysis apparatus 12. Specifically, the rate of water discharged from the water electrolysis apparatus 12 and that from the decompression water supply device 112 are controlled at substantially the same rate by control of the pressure and the flow rate of water through the pressure reducing valve 114 and the flow control valve 116.

For the third embodiment described above, the pressure and the flow rate of water separated by the high-pressure gas-liquid separator 22 are controlled by the pressure reducing valve 114 and the flow control valve 116 included in the decompression water supply device 112, and the water is then supplied to the low-pressure gas-liquid separator 14. Therefore, substantially the same advantageous effects as in the first embodiment previously described, such as maintaining the water level WS in the tank unit 88 always constant, preventing water stored in the tank unit 88 of the high-pressure gas-liquid separator 22 from being unnecessarily discharged, and being able to supply the water to a water electrolysis process in a circulating manner, are obtainable.

Figure 6:
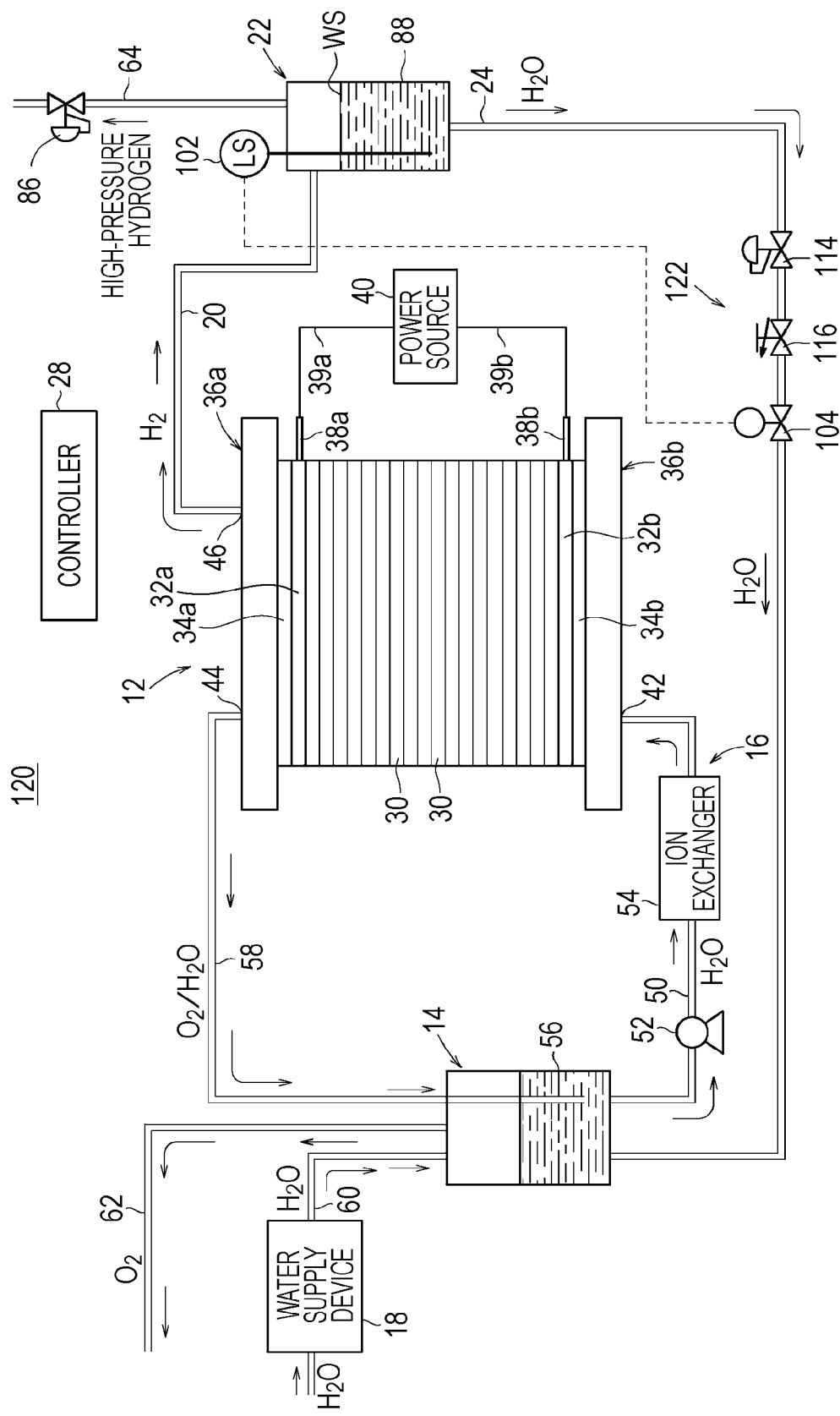
FIG. 6 illustrates a schematic configuration of a water electrolysis system according to a fourth embodiment of the present invention.
Figure 7:
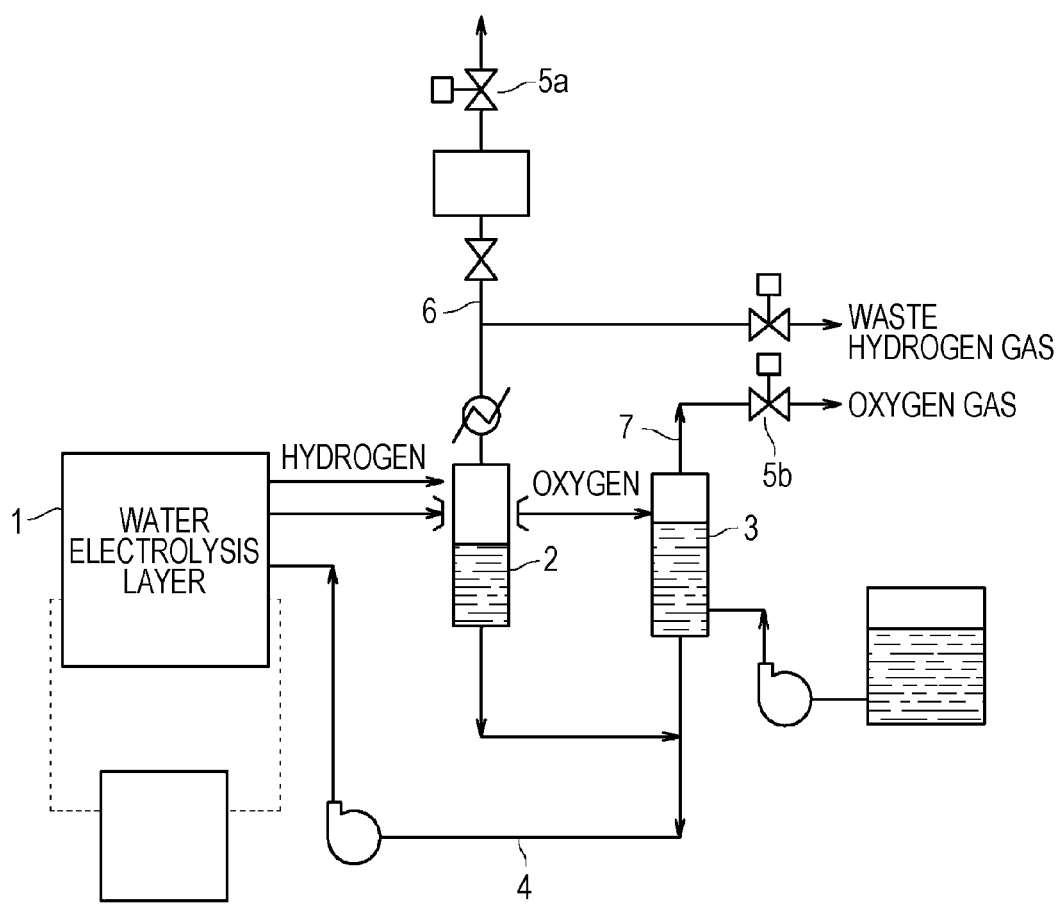
FIG. 7 illustrates a solid polymer water electrolysis hydrogen production device disclosed in the related art.

FIG. 6 illustrates a schematic configuration of a water electrolysis system 120 according to a fourth embodiment of the present invention.

The water electrolysis system 120 includes a decompression water supply device 122 arranged at the water pipe 24. The decompression water supply device 122 includes the pressure reducing valve 114, the flow control valve 116, and the solenoid valve 104 arranged in sequence along the direction from the high-pressure gas-liquid separator 22 toward the low-pressure gas-liquid separator 14, i.e., along the direction in which water is discharged. The tank unit 88 of the high-pressure gas-liquid separator 22 is provided with the water-level sensor 102.

In this case, the amount of hydrogen produced by the water electrolysis apparatus 12 and the hydrogen pressure are variable, and the rate of water discharged from the water electrolysis apparatus 12 varies.

Thus, the decompression water supply device 122 is set such that the water permeation rate in the decompression water supply device 122 is always larger than the maximum value of the rate of water discharged from the water electrolysis apparatus 12. Specifically, the rate of water discharged from the decompression water supply device 122 is controlled so as to be always larger than the maximum value of the rate of water discharged from the water electrolysis apparatus 12 by control of the pressure and the flow rate of water through the pressure reducing valve 114 and the flow control valve 116.

When the water-level sensor 102 detects that the water level WS in the tank unit 88 has reached the uppermost water level Hh, the solenoid valve 104 is opened by the controller 28; when the water-level sensor 102 detects that the water level WS in the tank unit 88 has reduced to the lowermost water level Hl, the solenoid valve 104 is closed.

The fourth embodiment is substantially a combination of the second and third embodiments and can achieve substantially the same advantageous effects as in the above first to third embodiments.

According to the embodiment of the present invention, a water electrolysis system includes a water electrolysis apparatus, a low-pressure gas-liquid separator, and a high-pressure gas-liquid separator. The water electrolysis apparatus electrolyzes water and generates oxygen and high-pressure hydrogen having a higher pressure than that of the oxygen. The low-pressure gas-liquid separator separates the oxygen and the water received from an anode of the water electrolysis apparatus into the hydrogen and water and supplies the separated water to the water electrolysis apparatus in a circulating manner. The high-pressure gas-liquid separator separates the high-pressure hydrogen discharged from a cathode of the water electrolysis apparatus and permeation water that has permeated from the anode and into the high-pressure hydrogen and water.

The water electrolysis system further includes a water pipe and a decompression water supply device arranged at the water pipe. The water pipe connects the high-pressure gas-liquid separator and the low-pressure gas-liquid separator and is used for returning the water from the high-pressure gas-liquid separator to the low-pressure gas-liquid separator. The decompression water supply device decompresses the water discharged from the high-pressure gas-liquid separator.

The decompression water supply device in the water electrolysis system may preferably reduce a pressure of the high-pressure water discharged from the high-pressure gas-liquid separator to substantially the same pressure as that of the low-pressure gas-liquid separator and discharge substantially the same amount of the water as a moisture content calculated on the basis of an electrolytic current in the water electrolysis apparatus.

The high-pressure gas-liquid separator in the water electrolysis system may preferably include a water-level sensor, and the water pipe may preferably be provided with an on-off valve that is opened or closed in response to a signal from the water-level sensor.

The decompression water supply device in the water electrolysis system may preferably include a water permeable member that decompresses the water and causes the water to permeate therethrough.

For the water electrolysis system, the water permeable member may preferably be a water permeable membrane, the decompression water supply device may preferably further include a high-pressure separator, a low-pressure separator, and a porous member, the water permeable member may preferably be disposed between the high-pressure separator and the low-pressure separator, and the porous member may preferably be arranged inside the low-pressure separator.

With the embodiments of the present invention, water stored in the high-pressure gas-liquid separator is decompressed by the decompression water supply device and is supplied to the low-pressure gas-liquid separator through the water pipe. The low-pressure gas-liquid separator supplies the water obtained by gas-liquid separation and the water supplied from the high-pressure gas-liquid separator to the water electrolysis apparatus in a circulating manner.

Therefore, water stored in the high-pressure gas-liquid separator is not unnecessarily discharged, and the water can be efficiently supplied to a water electrolysis process in a circulating manner. This enables satisfactory removal of water from generated high-pressure hydrogen and economical use of the water.

Obviously, numerous modifications and variations of the present invention are possible in light of the above teachings. It is therefore to be understood that within the scope of the appended claims, the invention may be practiced otherwise than as specifically described herein.

What is claimed is:

1. A water electrolysis system comprising:
   a water electrolysis apparatus configured to electrolyze water to generate oxygen and hydrogen having a pressure higher than a pressure of the oxygen;
   a low-pressure gas-liquid separator to separate the oxygen and the water that are received from an anode of the water electrolysis apparatus, the low-pressure gas-liquid separator being to supply the separated water to the water electrolysis apparatus in a circulating manner;
   a high-pressure gas-liquid separator to separate the hydrogen received from a cathode of the water electrolysis apparatus and permeation water that has permeated from the anode;
   a water pipe that connects the high-pressure gas-liquid separator and the low-pressure gas-liquid separator and that is used for returning the water from the high-pressure gas-liquid separator to the low-pressure gas-liquid separator; and
   a decompression water supply device that is arranged at the water pipe and that is to decompress the water discharged from the high-pressure gas-liquid separator,
   wherein the decompression water supply device reduces a pressure of the water discharged from the high-pressure gas-liquid separator to substantially a same pressure as a pressure of the low-pressure gas-liquid separator and discharges substantially a same amount of the water as a moisture content calculated on a basis of an electrolytic current in the water electrolysis apparatus,
   wherein the decompression water supply device includes a water permeable member that decompresses the water and causes the water to permeate through the water permeable member, and
   wherein an area of the water permeable member is set such that a rate of discharging water from the water electrolysis apparatus is substantially a same as a water permeation rate in the decompression water supply device.

2. The water electrolysis system according to claim 1, wherein the high-pressure gas-liquid separator includes a water-level sensor, and
   the water pipe is provided with an on-off valve that is opened or closed in response to a signal from the water-level sensor.

3. The water electrolysis system according to claim 1, wherein the water permeable member comprises a water permeable membrane,
   the decompression water supply device further includes a high-pressure separator, a low-pressure separator, and a porous member,
   the water permeable member is disposed between the high-pressure separator and the low-pressure separator, and
   the porous member is arranged inside the low-pressure separator.

4. The water electrolysis system according to claim 1, wherein the water permeable member comprises a solid polymer electrolytic membrane.

5. The water electrolysis system according to claim 1, wherein the decompression water supply device is provided along the water pipe between the high-pressure gas-liquid separator and the low-pressure gas-liquid separator such that it receives water from the high-pressure gas-liquid separator and discharges water to the low-pressure gas-liquid separator.

* * * * *